United States Patent [19]

Campbell, Jr.

[11] Patent Number: 5,066,741
[45] Date of Patent: Nov. 19, 1991

[54] PROCESS FOR PREPARATION OF SYNDIOTACTIC VINYL AROMATIC POLYMERS

[75] Inventor: Richard E. Campbell, Jr., Midland, Mich.

[73] Assignee: The Dow Chemical Company, Midland, Mich.

[21] Appl. No.: 559,475

[22] Filed: Jul. 30, 1990

Related U.S. Application Data

[63] Continuation-in-part of Ser. No. 498,162, Mar. 22, 1990, abandoned, which is a continuation-in-part of Ser. No. 414,846, Sep. 29, 1989, abandoned.

[51] Int. Cl.$^5$ .......................... C08F 4/76; C08F 12/08
[52] U.S. Cl. ..................... 526/171; 526/130; 526/134; 526/160; 526/170; 526/346; 526/347
[58] Field of Search ............... 526/171, 346, 130, 134, 526/160, 170

[56] References Cited

U.S. PATENT DOCUMENTS

| | | | |
|---|---|---|---|
| 4,774,301 | 9/1988 | Campbell, Jr. et al. | 526/347.2 X |
| 4,801,666 | 1/1989 | Marks et al. | 526/170 X |
| 4,808,680 | 2/1989 | Schmidt et al. | 526/347.1 X |

*Primary Examiner*—Fred Teskin
*Attorney, Agent, or Firm*—Douglas N. Deline

[57] ABSTRACT

A process for preparing syndiotactic vinyl aromatic polymers comprising contacting one or more aromatic monomers under polymerization conditions with a catalyst corresponding to the formula:

$$[Cp_mMX_nX'_p]^+A^-$$

wherein:
Cp is a single $\eta^5$-cyclopentadienyl or $\eta^5$-substituted cyclopentadienyl group;
M is a metal of Group 3, 4, 5, 6, 8, 9, 10 or the Lanthanide Series of the Periodic Table;
X each occurrence is an inert anionic ligand, with the proviso that at least one X is R;
X' is an inert, neutral, donor ligand;
R is hydride hydrocarbyl, silyl, a combination thereof or a substituted derivative thereof having up to 20 carbon, silicon or carbon and silicon atoms;
m and p are independently 0 or 1;
n is an integer greater than or equal to 1;
the sum of m and n is equal to the valence of M; and
$A^-$ is a noncoordinating, compatible anion of a Bronsted acid salt.

15 Claims, No Drawings

PROCESS FOR PREPARATION OF SYNDIOTACTIC VINYL AROMATIC POLYMERS

CROSS-REFERENCE TO RELATED APPLICATION

This is a continuation-in-part of application Ser. No. 498,162, filed Mar. 22, 1990, now abandoned, which is a continuation-in-part of application Ser. No. 414,846, filed Sept. 29, 1989, now abandoned, the teachings of both the foregoing prior applications are herein incorporated in their entirety by reference thereto.

BACKGROUND OF THE INVENTION

The present invention relates to a process for polymerizing vinyl aromatic monomers, such as styrene, to produce polymers having a high degree of syndiotacticity, and more particularly to a process for preparing polymers of vinyl aromatic monomers having a high degree of syndiotacticity using an alkylaluminoxane-free catalyst. Such polymers may be usefully employed in the preparation of solid objects and articles such as a moldings, films, sheets and foamed objects by molding, casting or the like process.

In U.S. Pat. No. 4,680,353 there is disclosed a process for the preparation of polymers of vinyl aromatic monomers having a stereoregular structure of high syndiotacticity by the use of certain coordination catalysts. Particularly disclosed were the reaction products of a titanium compound and an organoaluminum compound, especially polymethylaluminoxane. The process disclosed in this patent, however, requires the use of large amounts of the polymethylaluminoxane which is very expensive and difficult to make due to its very complex structure. Also, this process requires an expensive polymer purification system to remove remaining catalyst components due to the use of large amounts of the polymethylaluminoxane.

In U.S. Ser. No. 8,800, filed Jan. 30, 1987 (published in equivalent form as EP 277,004) there are disclosed certain bis(cyclopentadienyl) metal compounds formed by reacting a bis(cyclopentadienyl) metal complex with salts of Bronsted acids containing a non-coordinating compatible anion. The reference discloses the fact that such complexes are usefully employed as catalysts in the polymerization of olefins. For the teachings contained therein, the aforementioned U.S. Ser. No. 8,800 and EP 277,004 are herein incorporated in their entirety by reference thereto.

SUMMARY OF THE INVENTION

According to the present invention there is now provided a process for preparing polymers of vinyl aromatic monomers having a high degree of syndiotacticity which process comprises contacting at least one polymerizable vinyl aromatic monomer under polymerization conditions a catalyst comprising a metal complex containing compound corresponding to the formula:

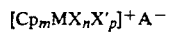

wherein:

Cp is a single $\eta^5$-cyclopentadienyl or $\eta^5$-substituted cyclopentadienyl group, the substituted cyclopentadienyl group being optionally also bonded to M through a substituent:

M is a metal of Group 3, 4, 5, 6, 8, 9, 10 or the Lanthanide Series of the Periodic Table:

X each occurrence is an inert anionic ligand, with the proviso that at least one X is R:

X' is an inert, neutral donor ligand;

R is hydride, hydrocarbyl, silyl, a combination thereof or a substituted derivative thereof having up to 20 carbon, silicon or carbon and silicon atoms:

m and p are independently 0 or 1;

n is an integer greater than or equal to 1; and the sum of m and n is one less than the valence of M, or when Cp is optionally bonded to M through a , the sum of m and n is two less than the valence of M; and A⁻ is a noncoordinating, compatible anion of a Bronsted acid salt.

DETAILED DESCRIPTION OF THE INVENTION

As used herein, the term "syndiotactic" refers to polymers having a stereoregular structure of greater than 50 percent syndiotactic of a racemic triad as determined by $C^{13}$ nuclear magnetic resonance spectroscopy. Such polymers may be usefully employed in the preparation of articles and objects (e.g., via compression molding, injection molding or other suitable technique) having an extremely high resistance to deformation due to the effects of temperature.

Also as used herein, the term "substituted" when used with reference to R means substituted hydrocarbyl or silyl groups such as haloalkyl, haloaryl, haloalkaryl, halosilyl, haloalkarylsilyl, alkoxyalkyl, and so forth, which are a combination of the recited X substituents other than R or a pendant hydrocarbyl or silyl group.

The term "inert" means noninterfering with the desired catalyst preparation or with the use of the resulting metal complex containing compound as a polymerization catalyst.

Illustrative but nonlimiting examples of X include R, halo, $NR_2$, $PR_2$, OR, SR, $BR_2$, etc.

Illustrative but nonlimiting examples of X' include ROR, RSR, $NR_3$, $PR_3$, $C_{2-20}$ olefin or diolefins, etc. Such donor ligands are able to form shared electron bonds but not a formal covalent bond.

The catalytically effective ingredients of the catalysts used in the present invention are prepared by combining at least two components as hereinafter disclosed. The first component is a derivative of a metal of Group 3, 4, 5, 6, 8, 9, 10 or the Lanthanide Series of the Periodic Table of the Elements containing at least one substituent which will combine with the cation of a second component (described hereinafter) or alternatively which is subject to oxidative activation as hereinafter described. The first component additionally must be capable of forming a cation formally having a coordination number that is one less than its valence. The second component is a salt of a Bronsted acid and a noncoordinating compatible anion or alternatively a salt of an oxidizing cation and a noncoordinating, compatible anion.

All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

As used herein, the recitation "noncoordinating, compatible anion" means an anion which either does not coordinate with the first component or a derivative thereof: or which is only weakly coordinated to said component thereby remaining sufficiently labile to be displaced by the vinyl aromatic monomer to be polymerized. The recitation "noncoordinating, compatible anion" specifically refers to an anion which when functioning as a charge balancing anion in the catalyst system of this invention does not transfer an anionic substituent or fragment thereof to the cationic portion of the catalyst. Compatible anions are also anions which are not degraded to neutrality under the reaction conditions of the present invention.

Monocyclopentadienyl and substituted monocyclopentadienyl groups for use according to the present invention are more specifically depicted by the formula:

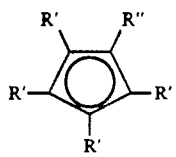

wherein:

R' each occurrence is independently selected from the group consisting of hydrogen, halogen, R, N—R$_2$, P—R$_2$; OR; SR or BR$_2$, wherein R is as previously defined: and R" individually may be R' or a group that is covalently bonded to M.

Preferably, R' is alkyl or haloalkyl of up to 6 carbons, and preferably R" is C$_{2-6}$ oxyalkylene or alkylene.

Illustrative, but not limiting examples of metal derivatives (first components) which may be used in the preparation of the compounds of this invention are derivatives of titanium, zirconium, hafnium, chromium, lanthanum, etc.

More preferably such metal derivative compounds are those having organyl substituents that are either devoid of reactive hydrogens or wherein potentially reactive hydrogens are protected by bulky protecting groups. Illustrative, but not limiting examples of suitable metal derivative compounds include: tetranorborenyl titanium, tetrabenzyl zirconium, tetraneopentyl titanium, (cyclopentadienyl)dimethyl(isopropoxy)titanium, (cyclopentadienyl)dibenzyl(isopropoxy)titanium, (cyclopentadienyl)dibenzyl(phenoxy)zirconium, (cyclopentadienyl)dibenzyl(isopropoxy)hafnium, (cyclopentadienyl)dimethylzirconium chloride, (cyclopentadienyl)methylyitrium chloride, bis(phenoxy)di(trimethylsilyl)zirconium, phenoxytrimethylzirconium, bis(2,6-diisopropyl-4-methyl)phenoxy)dibenzyltitanium, bis(2,4,6-trimethylphenoxy)dibenzyltitanium, tri(tertiary butyl)siloxytrimethyl zirconium, bismethoxydi(phenylmethyl)titanium, bis(2,4,6-trimethylphenoxy) dibenzyltitanium, triphenoxybenzyltitanium, bis(2,4,6-trimethylphenoxy)propylscandium, butoxytris((trimethylsilyl)methyl)zirconium, dimethoxydimethylzirconium, 4-(1-methyl-1-(4-methoxyphenyl)ethyl)-phenoxy tribenzyl titanium, dinorborneyldichlorotitanium, tribenzyltitanium hydride, cyclopentadienyltribenzylzirconium, cyclopentadienyltribenzyltitanium, cyclopentadienyltrimethyltitanium, cyclopentadienyltrimethylzirconium, cyclopentadienyltrineopentyltitanium, cyclopentadienyltri(diphenylmethyl)zirconium, cyclopentadienyltriphenylzirconium, cyclopentadienyltrineopentylzirconium, cyclopentadienyldi(m-tolyl)zirconium, cyclopentadienyldi(p-tolyl)zirconium, cyclopentadienyltrimethyltitanium hydride, cyclopentadienyltridiphenylmethylzirconium, and the like; hydrocarbyl-substituted cyclopentadienyl compounds such as pentamethylcyclopentadienyltrimethylzirconium, ethylcyclopentadienyltrimethylzirconium, pentamethylcyclopentadienyltribenzylzirconium, n-butylcyclopentadienyltrineopentyltitanium, (t-butylcyclopentadienyl)tri(trimethylsilyl)zirconium, cyclohexylcyclopentadienyldimethylzirconium, (pentamethylcyclopentadienyl)dimethylzirconium chloride, indenyldibenzyltitanium chloride, (pentamethylcyclopentadienyl)diisopropoxyhafnium chloride, (benzylcyclopentadienyl)di(m-tolyl) titanium chloride, (diphenylcyclopentadienyl)dinorborneylzirconium chloride, methylcyclopentadienyltriphenylzirconium, tetraethylcyclopentadienyltribenzylzirconium, propylcyclopentadienyltrimethylzirconium, propylcyclopentadienyltrimethylzirconium, (n-butylcyclopentadienyl) dimethyl(n-butoxy)titanium, cyclopentadienyldiphenylisopropoxyzirconium, cyclohexylmethylcyclopentadienyltribenzylzirconium, cyclohexylmethylcyclopentadienyltrimethylzirconium, cyclopentadienylzirconium dihydride, benzylcyclopentadienyldimethylhafnium, indenyltribenzylzirconium, trimethylsilylcyclopentadienyltrimethylzirconium, trimethylgermylcyclopentadienyl)trimethyltitanium, trimethylstannylcyclopentadienyltribenzylzirconium, (pentatrimethylsilyl)cyclopentadienyltrimethylzirconium, trimethylsilylcyclopentadienyltrimethylzirconium, penta(trimethylsilyl)cyclopentadienyltribenzyltitanium, trimethylgermylcyclopentadienyltriphenylhafnium, cyclopentadienylbis(p-tolyl)scandium, cyclopentadienyldibenzylchromium, pentamethylcyclopentadienylbis(trimethylsilylmethyl)yitrium, pentamethylcyclopentadienylbis(trimethylsilylmethyl)scandium, pentamethylcyclopentadienylbis(trimethylsilyl)lanthanum, and the like; halogen-substituted cyclopentadienyl compounds such as trifluoromethylcyclopentadienyltrimethylzirconium, trifluoromethyloycyclopentadienyltrinorborneylzirconium, trifluoromethylcyclopentadienyltribenzylzirconium, and the like: silyl-substituted (cyclopentadienyl)metal compounds such as cyclopentadienyltrimethylsilylzirconium, cyclopentadienyltri(phenyldimethylsilyl)zirconium, and the like.

Other compounds which are useful in the catalyst compositions of this invention especially compounds containing other Group 3, 4, 5, 6, 8, 9, 10 or Lanthanide metals will, of course, be apparent to those skilled in the art.

Preferred components are titanium or zirconium compounds.

Compounds useful as a second component in the preparation of the catalyst used in this invention may, in one embodiment, comprise a cation, which is a Bronsted acid capable of donating a proton, and a compatible, noncoordinating anion. In another embodiment such compounds comprise an oxidizing cation and a compatible, noncoordinating anion. Preferred anions are those containing a single coordination complex comprising a charge-bearing metal or metalloid core which anion is relatively large (bulky), capable of stabilizing the active catalyst species (the Group 3, 4, 5, 6, 8, 9, 10 or Lanthanide Series cation) formed when the two components are combined, and which will be sufficiently labile to be displaced by the polymerizable vinyl aromatic monomer.

The recitation "metalloid", as used herein, includes non-metals such as boron, phosphorus and the like which exhibit semi-metallic characteristics. Suitable metals, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known. In light of this, salts containing anions comprising a coordination complex containing a single boron atom are preferred.

Preferably, second components useful in the preparation of the catalysts used in this invention may be represented by the following general formulas:

$$(L-H)^+[A]^- \quad (I)$$

or $$Ox^+[A^*]^- \quad (II)$$

wherein:

L is a neutral Lewis base;

$(L-H)^+$ is a Bronsted acid:

$[A]^-$ is a compatible, noncoordinating anion;

$Ox^+$ is an organic or metallic oxidizing cation: and $[A^*]^-$ is a compatible, noncoordinating, inert, anion.

By the term "inert" as employed above is meant that A* of formula (II) comprises an anion which is a single coordination complex comprising a plurality of lipophilic radicals covalently coordinated to and shielding a central formally charge-bearing metal or metalloid atom, which anion is bulky and stable under the oxidation and subsequent polymerization conditions, and which anion is compatible with and noncoordinating towards the resulting polymerization catalyst. The anion is employed only to provide charge balance without interfering with the oxidizing ability of $Ox^+$.

Anions comprising boron which are particularly useful as $[A^*]^-$ may be represented by the following general formula:

$$[BX_1X_2X_3X_4]^-$$

wherein:

B is boron in a valence state of 3:

$X_1$ to $X_4$ are the same or different nonreactive, organyl or silyl radicals containing from 6 to 20 carbon or silicon atoms. In addition two or more of $X_1$ to $X_4$ may be linked to each other through a stable bridging group. Preferably $X_1$ to $X_4$ lack reactive hydrogen moieties. That is, the radicals are either devoid of hydrogen, contain only hydrogen in nonactivated positions or contain sufficient steric hinderence to protect potentially active hydrogen sites. Examples of suitable radicals for $X_1$ to $X_4$ are perfluorinated hydrocarbyl radicals containing from 1 to 20 carbon atoms, 3,4,5-trifluorophenyl, 3,4-di(trifluoromethyl)phenyl, etc.

A most highly preferred compatible, non-coordinating, inert, anion for use in compounds corresponding to formula (II) is tetra(pentafluorophenyl)borate.

Suitable oxidizing cations include organic and inorganic cations having sufficient electronegativity to oxidize the metal derivatives. Organic oxidizing cations for use in the compounds corresponding to formula (II) include ferrocenium ions, indenium ions and cationic derivatives of substituted ferrocene, indene, and the like molecules. Suitable metallic oxidizing cations include $Ag^{+1}$, $Pd^{+2}$, $Pt^{+2}$, $Hg^{+2}$, $Hg^{+2}$, $Au^+$ and $Cu^+$. The process of the invention involves a molecular oxidation. The Group 3, 4, 5, 6, 8, 9, 10 or Lanthanide metal is previously fully oxidized. Highly preferred oxidizing cations have an oxidation potential of at least +0.20 volt and preferably at least +0.25 volt. Most highly preferred oxidizing cations are ferrocenium and $Ag^{+1}$ cations.

Without wishing to be bound by any particular theory of operation it is believed that the oxidizing cation causes the molecular oxidation of the metal derivative, and in the process becomes a neutral species. The oxidized metal derivative loses a hydrogen or hydrocarbyl radical (·R) by a unimolecular elimination reaction. Two or more such radicals form a hydrogen molecule or a neutral organic species of the formula $R-R_x$) where x is an integer. These byproducts are neutral or noninterfering with any subsequent polymerization reaction and may also be removed from the reaction mixture. The preparation technique is analogous to that previously disclosed by R. Jordan, et al., J. A. C. S., 109, 4111–4113 (1987).

Illustrative, but not limiting, examples of oxidizing agents according to formula (II) are ferrocenium tetra(pentafluorophenyl)borate, gold (I) tetrakis 3,4,5-trifluorophenyl borate, silver tetra(pentafluorophenyl borate, 1,1'-dimethylferrocenium tetrakis 3,5-bistrifluoromethylphenyl borate and the like.

Returning to above formula (I), preferably $A^-$ corresponds to the formula:

$$[M'Q_{n'}]^-$$

wherein:

M' is a metal or metalloid selected from Groups 5–15 of the Periodic Table of the Elements;

Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide;

n' is an integer from 2 to 8; and n−m=1;

Second components comprising boron are particularly useful in the preparation of catalysts of formula (I) and may be represented by the following general formula:

$$[L-H]^+[BQ_4]^-$$

wherein:

L is a neutral Lewis base:

$[L-H]^+$ is a Bronsted acid:

B is boron in a valence state of 3: and

Q is as previously defined.

Illustrative, but not limiting, examples of boron compounds which may be used as a second component in formula (I) are trialkyl-substituted ammonium salts such as triethylammonium tetraphenylborate, tripropylammonium tetraphenylborate, tri(n-butyl)ammonium tetraphenylborate, trimethylammonium tetra(p-tolylborate), tributylammonium tetrakispentafluorophenylborate, tripropylammonium tetrakis-2,4-dimethylphenylborate, tributylammonium tetrakis-3,5-dimethylphenylborate, triethylammonium tetrakis-(3,5-ditrifluoromethylphenyl)borate and the like. Also suitable are N,N-dialkyl anilinium salts such as N,N-dimethylanilinium tetraphenylborate, N,N-diethylanilinium tetraphenylborate, N,N-2,4,6-pentamethylanilinium tetraphenylborate and the like; dialkyl ammonium salts such as di-(i- propyl)ammonium tetrakispentafluorophenylborate, dicyclohexylammonium tetraphenylborate and the like; and triaryl phosphonium salts such as triphenylphosphonium tetraphenylborate, tri(methylphenyl)phosphonium tetrakis-pentafluorophenylborate, tri(dimethylphenyl)phosphonium tetraphenylborate and the like.

Similar lists of suitable compounds containing other metals and metalloids which are useful as second components could be made, but such lists are not deemed necessary to a complete disclosure. In this regard, it should be noted that the foregoing lists is not intended to be exhaustive and other boron compounds that would be useful as well as useful components containing other metals or metalloids would be readily apparent from the foregoing general formula and examples to those skilled in the art.

In general, the catalyst can be prepared by combining the two components in a suitable solvent at a temperature within the range from about $-100°$ C. to about $300°$ C. The catalyst system can also form in situ if the components thereof are added directly to the polymerization process and a suitable solvent or diluent, including condensed monomer, is used in said polymerization process. It is, however, preferred to form the catalyst in a separate step in a suitable solvent prior to adding the same to the polymerization step. The catalysts' components are generally sensitive to both moisture and oxygen and should be handled and transferred in an inert atmosphere such as nitrogen, argon or helium.

As previously indicated, the improved catalyst of the present invention will, preferably, be prepared in a suitable solvent or diluent. Suitable solvents or diluents include any of the solvents known in the prior art including, but not necessarily limited to, straight and branched-chain hydrocarbons such as $C_{6-12}$ alkanes (hexane, heptane, octane and the like); $C_{6-12}$ cyclic and alicyclic hydrocarbons such as cyclohexane, cycloheptane, methylcyclohexane, methylcycloheptane and the like and $C_{6-12}$ aromatic and alkyl-substituted aromatic compounds such as benzene, toluene, xylene, decalin, and the like, and mixtures thereof.

The catalysts may be employed as homogeneous catalysts or supported on the surface of a suitable support such as alumina or silica.

In general, catalysts according to the present invention can be selected so as to produce polymer products that will be free of certain trace metals generally found in polymers produced with Ziegler-Natta type catalysts containing cocatalysts such as aluminum or magnesium based compounds.

In a highly preferred embodiment of the present invention $C_p$ is pentamethylcyclopentadiene, m is zero or one, M is titanium or zirconium, n is two or three; p is zero, X is R or OR, and A is tetrakis-pentafluorophenyl borate. In a most preferred embodiment X is $C_{1-20}$ alkyl, aryl, aralkyl, phenoxyalkoxy and m is 0 or 1.

In the practice of the present invention, vinyl aromatic monomers can be polymerized in the presence of the catalyst as mentioned above. Suitable vinyl aromatic monomers which can be polymerized in the process of the present invention include those represented by the formula:

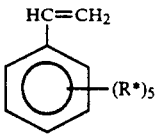

wherein each R* is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butyl styrene, p-vinyl toluene etc. with styrene being especially suitable. Copolymers of styrene and the above vinyl aromatic monomers other than styrene can also be prepared.

The polymerization may be conducted under slurry, bulk or suspension polymerization conditions or other suitable reaction conditions including solid, powdered reaction conditions. The polymerization can be conducted at temperatures of from $0°$ C. to $160°$ C., preferably from $25°$ C. to $100°$ C., more preferably from $30°$ C. to $80°$ C., for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (6.9 kPa–3,400 kPa). The use of ambient or low pressures, e.g., 1–5 psig (6.9–34.5 kPa) is preferred in view of lower capital and equipment costs.

The polymerization may be conducted in the presence of an inert diluent or solvent or in the absence thereof, i.e., in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E ®, available from Exxon Chemical Company. Suitable amounts of solvent are employed to provide a monomer concentration from 5 percent to 100 percent by weight.

The molar ratio of the vinyl aromatic monomer to the catalyst (in terms of metal) may range from 100:1 to 500,000:1, preferably from 3,500:1 to 200,000:1. In the case of using a solvent, the catalyst may be used at a concentration with the range from about $10^{-7}$ to about $10^{-1}$ moles per liter of solvent.

As in other similar polymerizations it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, etc. may be employed. In addition a small amount of an aluminum trialkyl compound or similar scavenger may be added to the reaction mixture to protect the catalyst from deactivation by contaminants in the reaction mixture.

Purification of the resulting polymer to remove entrained catalyst may also be desired by the practitioner. Purification of the resulting polymer prepared by the process of this invention is much easier than a conventional process since the process of this invention does not use polyalkylaluminoxane which is used in large quantities as cocatalysts in the conventional process. Entrained catalyst may generally be identified by residues of ash on pyrolysis of the polymer that are attributable to catalyst metal values. A suitable technique for removing such compounds is by solvent extraction, e.g., extraction utilizing hot, high boiling chlorinated solvents, acids or bases such as caustic followed by filtration.

Having described the invention, the following examples are provided as further illustrative and are not to be construed as limiting. Unless stated to the contrary, all parts and percentages are based on weight.

EXAMPLE 1

Preparation of Catalyst

In a flask, 0.10 gm of pentamethylcyclopentadienyltitanium trimethyl was added to a suspension of 0.343 gm of tri(ethyl)ammonium tetra(pentafluorophenyl)borate in 10 ml of toluene at room temperature. The obtained mixture was allowed to stir for 10 hours, and then heated to 45° C. for one hour. No precipitate was observed since the mixture was a very dark solution. The toluene solvent was stripped off in-vacuo thereby leaving a black solid. This solid was washed 3 times with 5 ml of petroleum ether and dried in-vacuo. The product comprised a composition having a structure as identified by $^{13}$C NMR of the formula:

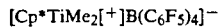

[Cp*TiMe$_2$[+]B(C$_6$F$_5$)$_4$]$^-$

Preparation of Syndiotactic Polystyrene

A dry 20 ml vial was charged with 0.025 gm (28 umole) of the above catalyst and then 10.0 gm (102.9 mmol) of styrene was added. The vial was capped with a teflon coated septa and a metal crimp cap, and shook until most of the catalyst was dissolved. The vial was placed in a 70° C. water bath for 3 hours and then the vial was taken out from the water bath and the polymerization was stopped by the addition of methanol. The off-white, insoluble product was washed with methanol and dried in-vacuo to obtain 3.32 gm of a resultant polymer. The resultant polymer was insoluble in methylene chloride or other common solvents for atactic polystyrene.

The resultant polystyrene had a melting point of 268° C. (by DSC) and syndiotacticity of greater than 95 percent by C$^{13}$ analysis. The polymer had a weight average molecular weight (Mw) of 382,000.

EXAMPLES 2–11

The reaction conditions of Example 1 were substantially repeated excepting that various catalysts and reactant ratios were employed. Accordingly, a dry 20 ml vial was charged with the catalyst further described in Table I. Styrene was added, the vial was capped with a teflon coated septa and a metal crimp cap, and shook until the mixture had mostly dissolved or the mixture gelled rendering further mixing impossible. The vial was placed in a 70° C. water bath for 3 hours and then the vial was taken out from the water bath and the polymerization stopped by the addition of methanol. The off white, insoluble polymer was washed with methanol and dried in-vacuo. In all cases the polymer was insoluble in methylene chloride and other common solvents for atactic polystyrene. Crystalline melting points were determined by differential scanning calorimetry, DSC. Syndiotacticities were determined by $^{13}$C NMR analysis. Results are contained in Table I.

TABLE I

| Example | Complex[a] | Mole Radio Sty:Ti | Temp °C. | Time Hr. | % Yield | % Syndio | DSC °C. | Mw ×10³ |
|---|---|---|---|---|---|---|---|---|
| 2 | CMTTB | 3700:1 | RT | 4.0 | 10.4 | >95 | 263 | 544 |
| 3 | CBTTB | 7500:1 | 70 | 1.5 | 24.1 | >95 | 270 | — |
| 4 | CBTTB | 7500:1 | 70 | 4.0 | 38.0 | >95 | 269 | — |
| 5 | CBTTB[b] | 7500:1 | 70 | 4.0 | 4.5 | — | 260 | — |
| 6 | CBTTB[c] | 7500:1 | 70 | 4.0 | 1.4 | — | 267 | — |
| 7 | CBTTB | 10000:1 | 70 | 2.0 | 20.9 | — | 270 | 584 |
| 8 | CSTTB | 7500:1 | 70 | 1.5 | 8.6 | — | 270 | 340 |
| 9 | CTBOMB | 10000:1 | 70 | 2.0 | 10.0 | — | 270 | — |
| 10 | CBTTB[d] | 10000:1 | 70 | 2.0 | 49.8 | — | 266 | — |
| 11 | CBTTB[de] | 10000:1 | 70 | 2.0 | 32.9 | — | 265 | — |

[a]CDTTB = cyclopentadienyldimethyltitanium tetra(pentafluorophenyl)borate, (Cp*Ti(CH$_3$)$_2$TB),
CBTTB = cyclopentadienyldibenzyltitanium tetra(pentafluorophenyl)borate (Cp*Ti(CH$_2$C$_6$H$_5$)$_2$TB),
CSTTB = cyclopentadienylditrimethylsilylmethyltitanium tetra(pentafluorophenyl)borate (Cp*Ti(CH$_2$Si(CH$_3$)$_3$)$_2$TB),
CTBOMB = cyclopentadienyldibenzylmethoxytitanium tetra(pentafluorophenyl)borate (Cp*Ti(CH$_2$C$_6$H$_5$)(OCH$_3$)TB)
[b]2 ml of o-dichlorobenzene added
[c]2 ml of chloroform added
[d]prepared from diisopropylethylammonium tetra(pentafluoro)boron
[e]unwashed catalyst

EXAMPLES 12–15

The reaction conditions of Example 1 were substantially repeated excepting that an aluminum trialkyl compound was also present in the reaction mixture. Accordingly, a dry 20 ml vial was charged with the catalyst further described in Table II. (The catalysts were prepared according to the technique of Example 1 or (in Example 15) by contacting in equimolar quantities monocyclopentadienyl titanium tribenzyl with ferrocenium tetra(pentafluorophenyl)borate in toluene.) To a second vial styrene and an aluminum trialkyl compound (in 1M toluene solution) were combined. This solution was added to the vial containing the titanium complex, capped with a teflon coated septa and a metal crimp cap, and shook until the mixture had mostly dissolved or the mixture gelled rendering further mixing impossible. The vial was placed in a 70° C. water bath for 2 hours and then the vial was taken out from the water bath and the polymerization stopped by the addition of methanol. The off white, insoluble polymer was washed with methanol and dried in-vacuo. In all cases the polymer was insoluble in methylene chloride and other common solvents for atactic polystyrene. Crystalline melting points were determined by differential scanning calorimetry, DSC. Syndiotacticities were determined by $C^{13}$ NMR analysis. Results are contained in Table II.

TABLE II

| Example | Complex[a] | Mole Ratio Styrene:Al:Ti | Temp °C. | Time Hr. | % Yield | % Syndio | DSC °C. | Mw ×10³ |
|---|---|---|---|---|---|---|---|---|
| 12 | CTBB[b] | 10000:20:1 | 70 | 2 | 29.4 | — | 266 | 287 |
| 13 | CTBB[c] | 10000:18:1 | 70 | 1.5 | 76.2 | — | 269 | 92 |
| 14 | CTBB[d] | 65000:9:1 | 70 | 1.5 | 26.6 | — | 270 | 690 |
| 15 | CTBB[d] | 39000:20:1 | 70 | 1.5 | 67.2 | — | 269 | 604 |

[a] CTBB = cyclopentadienyl titanium dibenzyl tetra(pentafluorophenyl)borate
[b] trimethylaluminum added to reaction
[c] triethylaluminum added to reaction
[d] triisobutylaluminum added to reaction

EXAMPLE 16

In an argon atmosphere dry box, a dry 20 ml vial was charged with 2.2 mg (4.4 μmol) of bis(2,4,6 trimethylphenoxy)dibenzyl titanium and 3.8 mg (4.4 μmol) of ferrocenium tetra(pentafluorophenyl) boron. To this was added 1 ml of dry, degassed toluene. The mixture was allowed to interact while being stirred for ~30 minutes, after which time a dark insoluble, oily product had formed. Styrene was added to the flask (10 ml, 87.4 mmol) the vial was capped with a Teflon TM coated septa and a metal crimp cap, shook until most of the complex had dissolved and then placed in a 70° C. water bath for 1.5 hours. The vial was removed from the water bath and the polymerization stopped by the addition of 2 ml of methanol. The off white, insoluble polymer was dried in-vacuo to obtain 0.34 gms of a resultant polymer. The polymer was insoluble in methylene chloride, MEK or other common solvents for atactic polystyrene, and had a crystalline melting point of 259° C., which is consistent with a polymer having >90 percent syndiotacticity.

EXAMPLES 17-22

Pentamethylcyclopentadienyltribenzyltitanium Tetra(pentafluorophenyl)borate catalyzed polymerization of p-methylstyrene and t-butylstyrene In an argon atmosphere dry box, a dry 20 ml vial was charged with a calculated amount of dried, degassed monomer to provide the monomer ratios indicated in Table III. The vial was capped with Teflon TM coated septa and a metal crimp clamp, then removed from the dry box. To this vial was added via syringe, 205 μl of a 0.0055M catalyst solution consisting of the reaction product derived from pentamethylcyclopentadienetribenzyl titanium, decamethylferrocenium tetra(pentafluorophenyl) borate and 5 equivalents of triisobutyl aluminum in toluene at room temperature. The vial was then placed in a 70° C. water bath for 1 hour. Polymerization was stopped by the addition of methanol. The polymer was washed with methanol and dried under reduced pressure.

Crystalline melting points were determined by differential scanning calorimetry, DSC. Results are contained in Table III.

TABLE III

| Ex. | Monomer | Ratio pMeSt:Al:Ti | Percent conv | DSC °C. |
|---|---|---|---|---|
| 17 | p-methylstyrene | 67,400:5:1 | 50.3 | 169, 198 |
| 18 | p-methylstyrene | 120,200:5:1 | 14.1 | 167, 196 |
| 19 | p-methylstyrene/- styrene (9.5/90.5) | 78,000:5:1 | 55.0 | 238 |
| 20 | t-butylstyrene | 49,100:5:1 | 69.4 | 310 |
| 21 | t-butylstyrene | 125,700:5:1 | 64.8 | 310 |
| 22 | t-butylstyrene/- styrene (10.1/89.9) | 76,000:5:1 | 56.6 | — |

What is claimed is:

1. A process for preparing polymers of vinyl aromatic monomers having a high degree of syndiotacticity comprising contacting one or more vinyl aromatic monomers under polymerization conditions with a catalytically effective amount of a catalyst comprising a metal complex containing compound the formula:

$$[Cp_mMX_nX'_p]^+A^-$$

wherein:

Cp is a single $\eta^5$-cyclopentadienyl or $\eta^5$-substituted cyclopentadienyl group, the substituted cyclopentadienyl group being optionally also bonded to M through a substituent:

M is a metal of Group 3, 4, 5, 6, 8, 9, 10 or the Lanthanide Series of the Periodic Table;

X each occurrence is an inert anionic ligand, with the proviso that at least one X is R:

X' is an inert, neutral, donor ligand:

R is hydride, hydrocarbyl, silyl, a combination thereof or a halo or alkoxy substituted derivative thereof having up to 20 carbon, silicon or carbon and silicon atoms:

m and p are independently 0 or 1;

n is an integer greater than or equal to 1, the sum of m and n is one less than the valence of M, or when Cp is optionally bonded to M through the substituent, the sum of m and n is two less than the valence of M; and $A^-$ is a noncoordinating, compatible anion of a Bronsted acid salt.

2. The process according to claim 1 wherein the monomer is contacted with the catalyst at a temperature from 0° C. to 160° C.

3. The process according to claim 1 wherein the monomer is contacted with the catalyst at a pressure of from about 1 to about 500 psig.

4. The process according to claim 1 wherein the monomer is contacted with the catalyst for from one minute to 100 hours.

5. The process according to claim 1 wherein the monomer is contacted with the catalyst in the presence of a solvent.

6. The process according to claim 5 wherein the solvent is selected from the group consisting of $C_{6-20}$ aliphatic, cycloaliphatic, aromatic, halogenated aliphatic, halogenated aromatic hydrocarbons and mixtures thereof.

7. The process according to claim 1, wherein the molar ratio of the vinyl aromatic monomer to the catalyst ranges from 100:1 to 500,000:1.

8. The process according to claim 1 wherein the vinyl aromatic polymer is represented by the formula:

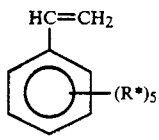

wherein each R* is independently hydrogen an aliphatic, cycloaliphatic or aromatic hydrocarbon group having from 1 to 10 carbon atoms; or a halogen atom.

9. The process according to claim 6 wherein the vinyl aromatic monomer is styrene.

10. The process according to claim 1 wherein M is titanium or zirconium.

11. The process according to claim 1 wherein Cp is pentamethylcyclopentadiene.

12. The process according to claim 1 wherein X each occurrence is R or OR.

13. The process according to claim 1 wherein m is 0 or 1, and n is 2 or 3.

14. The process according to claim 1 wherein A is tetrakis-pentafluorophenyl borate.

15. The process according to claim 1 conducted in the presence of an aluminum trialkyl compound.

* * * * *